United States Patent Office 3,784,683
Patented Jan. 8, 1974

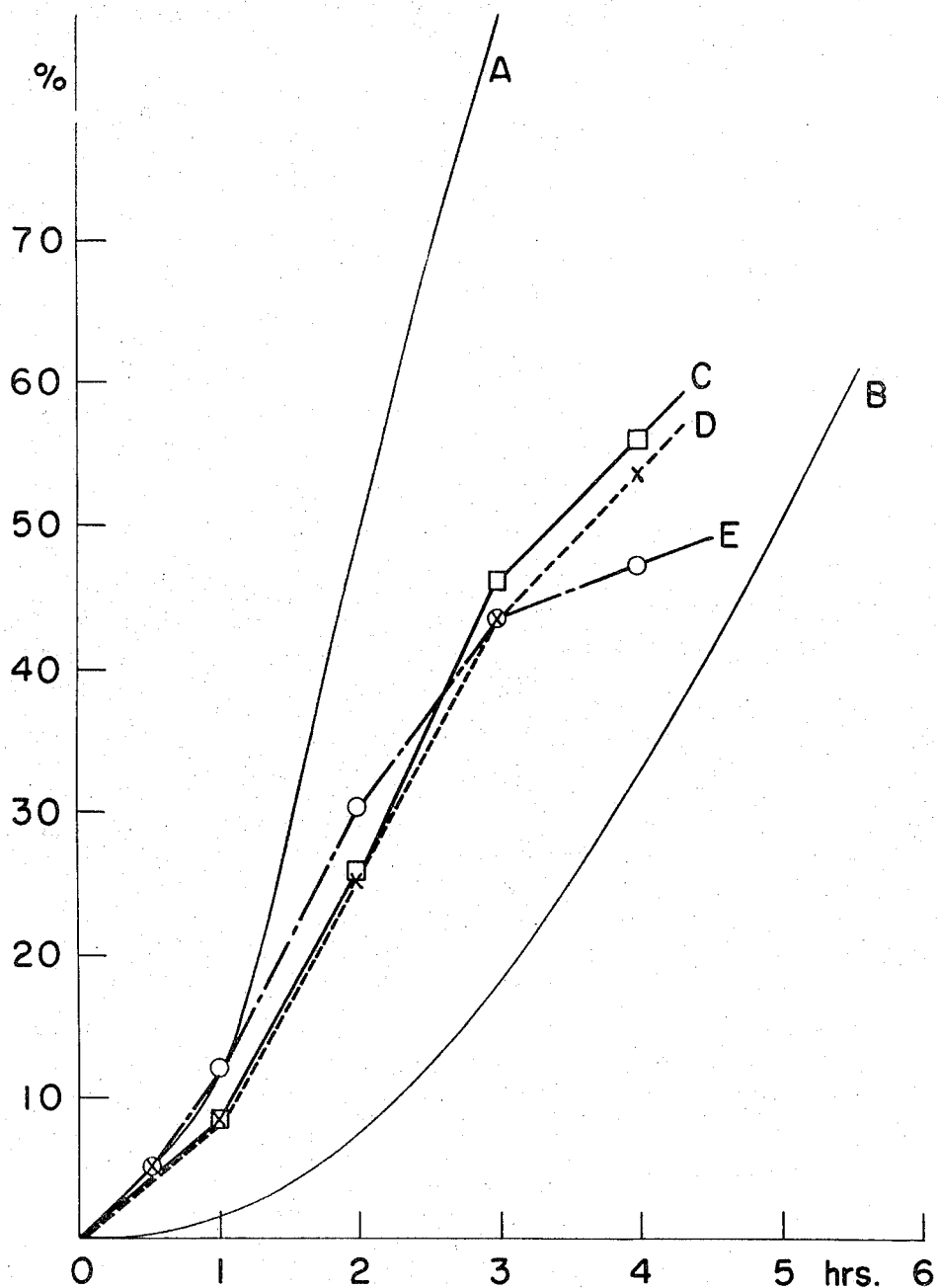

3,784,683
TABLET PREPARATION
Elliott Benjamin Prillig and Alexander Hing Chinn Chun, Waukegan, Ill., assignors to Abbott Laboratories, North Chicago, Ill.
Continuation of abandoned application Ser. No. 661,600, Aug. 18, 1967. This application Mar. 29, 1971, Ser. No. 129,225
Int. Cl. A61k 27/12
U.S. Cl. 424—19                                     2 Claims

ABSTRACT OF THE DISCLOSURE

A pharmaceutical dosage form for oral administration is provided which travels substantially intact through the stomach and the small intestines and exposes the active ingredient erythromycin stearate in the large intestines where it is particularly useful in combatting amebiasis, a parasitic infestation. The new dosage form is prepared in such a manner to substantially prevent the active drug from being absorbed by the gastro-intestinal tract.

---

This application is a continuation of Ser. No. 661,600, filed Aug. 18, 1967, now abandoned.

Pharmaceutical tablets for oral administration have, in the past, been provided with various coatings to mask the taste of the tablet, to provide prolonged or sustained release or to expose the active ingredient contained in the tablet to be absorbed in specific areas of the small intestines. It is known that various resins can be used to design the tablet for any of the above purposes but in all instances known, the aim is always to have the drug absorbed and taken up in the bloodstream. One of the favored ways to provide a drug in this fashion is by enterically coating the dosage form.

It is also known that the gastro-intestinal juices have various pH levels, changing from the acidic environment in the stomach to a slightly alkaline environment in the small intestines. With this knowledge, it is relatively simple to provide a dosage form from which the active ingredient is absorbed in a particular section of the gastro-intestinal tract. However, many drugs are known today which are designed specifically to act in the large intestines in order to combat bacteria or parasites. By the methods known in the art, drugs of that type are administered in the form of suppositories or by specially coated tablets. Even with the best techniques known to date, tablets or suppositories prove not to deliver a sufficiently large amount of active drugs to the large intestine because leaching or mechanical forces expose the drug from these dosage forms prematurely with the result that the drug is, at least to an undesirably high extent, taken up in the bloodstream and distributed in the body. Consequently, much larger dosages have been necessary to produce effective concentrations of the drug in the large intestines to compensate for said losses.

It is, therefore, an object of the present invention to provide a pharmaceutical dosage form for oral administration in which the active ingredient remains substantially unexposed to the juices in the stomach and small intestines. It is another object of the present invention to provide a new dosage form for oral ingestion in which the active ingredient is substantially fully exposed in the large intestines. It is a further object of this invention to provide an oral dosage form in which the active ingredient remains substantially unabsorbed by the gastro-intestinal tract. It is a particular object of the present invention to provide a tablet for oral administration from which the active ingredient is substantially fully exposed for dissolution only in the large intestines.

These and other objects are accomplished by providing a pharmaceutical dosage form for oral administration comprising an active drug and a resin, said resin embedding the individual particles of a drug in such a manner that said drug remains substantially protected by said resin while the particles travel through the stomach and small intestines of the patient, and exposing the drug substantially completely at the time the particles reach the small intestines, said resin and the amount of said resin being selected in such a manner that in an accelerated dissolution test, said drug dissolves in a defined simulated intestinal fluid to an extent of 2–12% within one hour and 18–88% within three hours. A dosage form as defined here may be processed into a pill, tablet, a suspension or a capsule since the drug particles are provided with resin protection to produce the desired result: the defined dosage form exposes its active ingredients substantially only in the area of the large intestine which area is known to provide minimal drug absorption. As a result, the patient to which the above-defined dosage form is administered does not attain a significant blood level of the drug; however, analysis of the feces will show that substantially all of the active ingredient is dissolved and available for topical medication to the large intestines. Dosage forms of the above description are, therefore, particularly useful and important in the topical treatment of infections and parasites located in the large intestines which require a relatively high concentration of the active ingredient and for drugs which preferably are not distributed throughout the body through the bloodstream.

The dosage form of the present invention is prepared by coating or embedding finely-divided particles of the drug in a relatively insoluble, pharmaceutically-acceptable resin, the amount of said resin being proportioned to the desired amount of said drug in such a manner that artificial intestinal juice dissolves 2–12% thereof within one hour and 18–88% thereof within three hours in the accelerated dissolution test described below. The particles so coated may then be compressed into a tablet or rolled into a pill, they may be suspended in a liquid vehicle suitable for oral administration, or they may be placed in a capsule which is prepared from materials which dissolve in the gastro-intestinal tract. Tablets made in this manner may be coated in order to make them pharmaceutically elegant or to provide them with a palatable taste, or for stability purposes. The coating of the tablet, however, is not necessary, if resin and drug are combined as defined above and further explained below.

It will be readily understood by those skilled in the art that numerous resins can be used to insure a perfect or near perfect coating on individual drug particles of course, some coated particles may form larger agglomerates during the coating operation but individual drug particles would still be substantially covered by the resin. Depending upon the solubility of the resin chosen, a smaller or larger amount thereof is combined with the active drug. The amount of resin used also depends to a minor extent upon the solubility of the drug which is to be administered. With a highly soluble drug, a somewhat larger amount of resin is used to insure minimum premature dissolution due to possible imperfection in the particle coating. With a highly soluble drug a coating over pills, capsules or compressed tablets may thus be desirable.

The dosage form of the present invention travels intact through the stomach and at least through the upper part of the small intestines. In the case of tablets, the tablet gradually disintegrates into smaller particles which are still substantially completely covered by the resin so that the drug contained in these particles is not exposed to the intestinal fluids. In the case of suspensions or capsules, the coated particles are exposed as such. As the coated particles move along in the small intestines, physical and chemical forces gradually break up agglomerates and wear down the resin surrounding the drug particles with the result that by the time they reach the large intestines, substantially all of the active drug is freely exposed. Those skilled in the art will readily be able to construct the dosage form of the present invention with proper selection of amount and type of resin to provide minimal exposure to the stomach and small intestines and maximal exposure in the large intestines. To enable an easy predetermination of the amount of a particular resin needed for a drug designed to act in the large intestines, the following test is used:

One or more tablets containing a known amount of an active drug and being constructed by combining drug and resin according to the present invention, are placed in a Stoll-Gershberg disintegration apparatus submerged in a known amount of artificial intestinal juice as described in the U.S. Pharmacopoeia XVII (1965, page 919) but modified by containing no pancreatin. The apparatus is moved up and down in the beaker containing the artificial intestinal fluid at a constant frequency rate of 28–32 cycles per minute through a distance of 5–6 cm. The artificial juice is kept at a temperature of 38° C. but in deviation of the disintegration test described in the U.S. Pharmacopoeia, no plastic discs are used. Small aliquots are removed every half hour from the disintegration beaker with a pipette which is extended at the uptake-end by a piece of plastic tubing containing a cotton pledget to prevent particulate matter from entering the pipette when removing the aliquot. Analysis of these aliquots containing only dissolved drug is performed by the method best suited for the particular drug in the tablet. In this fashion, the active drug is found in the assay only to the extent to which it dissolves; suspended free drug particles and those still covered or coated by the resin at the time of taking the aliquot are not included in the results. The described accelerated dissolution test provides a quick in vitro method for the determination of the in vivo behavior of the new dosage form. If the in vitro result shows a dissolution rate within the above given ranges (or, graphically, falls between the curves described below), the dosage form has the desired in vivo characteristics.

Pills, capsules or suspensions can be analyzed in the same manner as described here for tablets.

The drawing is a graph plotting the concentration of dissolved drug from specific and different tablets constructed according to the present invention against time and established by the described dissolution test. The concentrations of the active drug at various time intervals is indicated as percentages of the total amount of drug in the tablets tested. Line A is the curve of a tablet with a relatively fast dissolution rate; a tablet constructed to dissolve more rapidly than the one plotted in line A dissolves too fast to satisfy the topical application to the large intestines desired and would produce significant blood levels of the drug and consequently lower amounts of drug in the large intestine. Line B reflects the dissolution rate of a very slowly dissolving tablet according to the present invention; if the dissolution rate of that tablet would be further retarded by containing more resin or a more insoluble resin, the tablet may pass through the whole intestinal tract without full exposure of the active drug. Expressed differently, the dosage form prepared by the process of this invention and producing an in vitro dissolution curve by the above test which falls within the area between curves A and B produces the desired drug exposure in the large intestines of the human body without creating a significant blood level of the drug and without undue losses of unexposed active ingredient excreted with the feces. More specifically, the graph shows that a tablet in which the active ingredient dissolves within 1 hour to the extent of 2–12% and to the extent of 18–88% within 3 hours is well suited for the delivery of active ingredient substantially only in the large intestines. This means that the patient who ingests such a tablet will show substantially no blood-level of the drug, yet suitable analysis of only dissolved material present in the feces will prove that substantially all of the drug is dissolved and available for topical application to the large intestines.

In order to illustrate the process of making a tablet according to the present invention, reference is made to the following examples which, however, are not meant to limit the invention in any respect. In all instances, the mesh sizes given are those of Tyler mesh scale.

EXAMPLE I

A solution of 5 g. of Gelva C3–V30 ( a high-viscosity grade modified vinyl acetate resin marketed by the Shawinigan Resin Corporation) in 50 ml. of methylene chloride is added to 250 g. of erythromycin stearate in a mixing bowl and blended. Additional methylene chloride is added, if required, and mixing is continue until the mass is partially dry. The mixture is granulated and passed through a 20-mesh screen onto paper-lined trays and dried for 16 hours at 49° C. The dry erythromycin stearate granules are transferred to a mixing bowl again and a granulation of 132 g. of sodium citrate powder and 21 g. of polyvinyl pyrrolidone which has passed a 40-mesh screen is added. Ethanol is added to mass the mixture which is then granulated and passed through a 4-mesh screen onto paper-lined trays. The granules are dried as above and subsequently passed through a 14-mesh screen and placed in a blender together with 7.5 g. of a disintegrant of mesh size 40. The mixture is thoroughly blended and then compressed into tablets in the usual fashion to produce tablets weighing 425.5 mg. each, each tablet containing 150 mg. of erythromycin activity.

About 1,000 of these tablets are placed in a coating pan and coated in the usual fashion with about 150 ml. of a standard coating solution containing cellulose-acetate-phthalate, propylene glycol, a wetting or dispersing agent, yellow dyes, titanium dioxide, talcum powder, alcohol and acetone. The tablets are dusted with talcum powder after each application of coating solution until about one half of the coating solution has been applied. The remainder of the coating solution is added without talcum powder. The coated tablets are then dried on a tray for 12 hours at 37.8° C., 24 hours at 43° C. and 48 hours at 49° C.

Two of the above tablets are exposed to the dissolution test described above, using 650 ml. of modified simulated intestinal juice as test solvent. The artificial juice is prepared by dissolving 6.8 g. of monobasic potassium phosphate in about 900 ml. of water, adding about 38 ml. of N sodium hydroxide solution, adjusting the pH to 7.4 with additional N sodium hydroxide, if necessary, and diluting the solution to make up 1,000 ml.

Aliquots of 2 ml. each are taken from the solution every 30 minutes during the test. The aliquots are diluted with 7 ml. of water, shaken, and 2 ml. of this diluted solution are acidified with 2 ml. of 12 N sulfuric acid. A 2 ml. portion of an arsenomolybdate test solution is added, the mixture is held for 10–12 minutes in boiling water and subsequently cooled while shaking. Absorption of light at 730 m$\mu$ is determined in a spectrophotometer and compared with test solutions of known erythromycin content treated in identical manner as the present samples. The arsenomolybdate solution used is prepared by dissolving 50 g. of ammonium molybdate in 900 ml. of water, slowly adding 42 ml. of 96% sulfuric acid under stirring and chilling and adding thereto a solution of 6 g. of disodium hydrogen arsenate in 50 ml. of water. The test reagent is incubated for 24 hours at 37° C. and is protected from exposure to light until used. The results of the analysis of the aliquots are included in FIG. 1 and are represented there as line C.

When in the above example the compressed tablet is subjected to the described dissolution test before coating, the obtained dissolution curve is essentially the same as represented by line C in FIG. 1.

By using the same ingredients and procedures described above, 50 mg. erythromycin stearate tablets are made and tested by the above accelerated dissolution test prior to and after coating. The test results are included in FIG. 1: line D is the curve for the coated tablets, line E is that for the uncoated tablets. It is apparent that the coating over the tablets is not required and, if applied, does not change the dissolution rate of the tablets significantly. The curves also demonstrate clearly that no significant difference in dissolution rate is obtained between tablets containing 50 mg. or 150 mg. of the active drug.

EXAMPLE II

In a clinical test, 5 subjects were given 50 mg. erythromycin stearate tablets prepared in the manner described above but containing 6.5 mg. of cornstarch per tablet. Each subject was given a tablet every 8 hours for a total of 7 doses. Blood samples were taken from each subject one hour, 2 hours, 4 hours and 30 hours after the first tablet was ingested. The blood samples showed an average of below 0.02 mcg./ml. of erythromycin in the blood serum at 1 hour, 2 hours, and 4 hours and an average just above 0.02 mcg./ml. at 30 hours, showing that no significant amount of erythromycin was absorbed and taken up by the bloodstream. At the same time, all fecal excretions of the subjects were analyzed starting with the day on which medication started and covering a total of four days. The average amount of dissolved erythromycin found in the feces of the 5 subjects were 26 mcg./g. on the first day, 188 mcg./g. on the second day, 210 mcg./g. on the third day and 171 mcg./g. on the fourth day.

In a parallel study, 5 subjects were given seven standard film-coated 100 mg. tablets of erythromycin stearate at 8-hour intervals. The average blood levels attained in 1 hour was 0.09 mcg./ml. of blood serum, 0.12 mcg./ml. after 2 hours, 0.10 mcg./ml. after 4 hours and 0.06 mcg./ml. after 30 hours while feces analysis showed an average of 16 mcg./g. on the first day, 28 mcg./g. on the second day, 115 mcg./g. on the third day and 67 mcg./g. on the fourth day.

From the above figures it will be seen that standard tablets of erythromycin stearate produce a significant blood level of erythromycin while there is practically no erythromycin found in the bloodstream with tablets of the present invention. On the other hand, the active drug of the new tablets does not pass unexposed through the body as established by fecal analysis: the average amount of dissolved erythromycin found in the excretion of the subjects given standard 100 mg. tablets totals 226 mcg./g. while the 50 mg. tablets (half the dose) of the present invention produce a total excretion of 595 mgc./g. of dissolved erythromycin in four days.

EXAMPLE III

A group of 50 patients suffering from intestinal amebiasis was given two 150 mg. tablets per day of the erythromycin stearate tablets described in Example I. Each patient received medication for seven consecutive days. Parasitological and clinical examinations of the patients 15 days after completion of the medication scheduled showed that 44 of the patients were cured.

Another group of 30 patients suffering from ulcerative amebiasis was divided into two groups of 15. One group was given 300 mg. erythromycin tablets prepared according to Example I for seven days, the other group received 150 mg. tablets of the same type twice a day for seven days. Observation of the colon by rectosigmoidoscopy showed that ulcerations were healed and trophozoites could not be found in the mucosa of 24 of the above patients 30 days after completion of the treatment. In the other six, ulcerations were reduced in size and generally improved; trophozoites were present in the mucosa of four of these patients and were absent in the other two.

Although the above examples are specific to a particular resin with which individual drug particles are coated, it will be apparent that similar polymers can be used for that operation, e.g. carboxylated polyvinyl acetates, polyvinyl/maleic anhydride copolymers, poly(methacrylic acid), ethylene/maleic anhydride copolymers, ethylcellulose, methylacrylic acid/methyl methacrylate copolymers, and mixtures thereof including mixtures with shellac. More generally, any polymeric material which shows little solubility in gasto-intestinal juices can be used for embedding the individual drug particles.

The above examples demonstrate the manufacture of tablets containing erythromycin stearate as the active ingredient for topical application as an oral dosage form designed for the desired pharmaceutical effect in the large intestines. Such a tablet is particularly useful in combating amebiasis or other parasitic infestations affecting the lower portions of the digestive tract. However it is to be understood that this invention is not limited to tablets containing erythromycin as the active ingredient. Other drugs which are often administered to take effect against bacteria or parasites located in the large intestines are chloroquine, iodochlorhydroxyquin, diiodohydroxyquin, neomycin, certain tetracyclines and other drugs which are used in the disorders.

As mentioned above, those skilled in the art will easily recognize the amounts of a particular resin needed to provide a tablet showing the indicated dissolution rate. If a particularly insoluble resin or a particularly hard tablet is prepared with a selected resin, the disintegration rate of the tablet can be influenced by varying the amount of disintegrant incorporated into the tablet. Thus, for example, the above tablet contains 5% of a disintegrant and produces a dissolution test result of 9% in one hour and 47% in three hours. The same tablet can also be prepared using smaller or larger amounts of the same or another disintegrant. This variation changes the time elapsed until the ingested tablet breaks up into smaller particles but the dissolution rate of the drug does not change significantly; it depends only upon the type and proportion of the selected resin.

The present invention distinguishes from older dosage forms in that each drug particle is coated or embedded in a slowly disintegrating or slowly dissolving resin with the amount and type of resin specifically selected to provide essentially intact passage of the drug particle until the particle reaches the large intestine. The resin is selected in such a fashion that the dissolution rate is not pH dependent. This is a clear distinction from older dosage forms wherein a resin protects a drug particle only under specified pH conditions. Expressed differently, the dosage form of the present invention is made available for topical application to the large intestines as a function of time and not as a function of pH as in the dosage forms of the prior art.

It will be apparent to those skilled in the art that other methods can be used than that described above for embedding the drug particle or coating the drug particle with a resin; aside from pan coating, the drug particles may be coated by air-suspension coating or by other methods which provide a substantially complete coverage of the drug particles by a resin. Drug particles so coated can then be processed in the usual fashion to provide dosage forms as tablets, pills, capsules, or suspensions.

It will be apparent to those skilled in the art that suspensions, tablets or pills made according to the present invention may contain the usual excipients such as fillers, flavoring agents, diluents, dyes, pigments, etc. Depending on the final form desired, wetting agents, dispersing agents, plasticizers, disintegrants, etc. may be used to advantage in conjunction with the coated particles described above.

Also, it will be apparent that the particle size of the active drug is not of great significance since with larger particles, more resin distributes over less particles than with smaller particles coated with the same proportion of resin. Thus, substantially any particle size range of the drug may be employed as the dissolution can be adjusted by proper selection of the resin and its proportion.

We claim:

1. A pharmaceutical dosage form for oral administration particularly useful in combating amebiasis in humans, a parasitic infestation affecting the lower portion of the digestive tract, consisting essentially of an effective individual anti-amebiasis dosage quantity of particles of erythromycin stearate coated with or embedded in granulation amounts of a resin selected from the group consisting of carboxylated polyvinylacetate, polyvinylmaleic anhydride copolymers, poly(methacrylic acid), ethylene maleic anhydride copolymers, ethyl cellulose, methacrylic acid, methylmethacrylate copolymers, waxes, mixtures thereof and mixtures of these resins with shellac, said resin slowly disintegrating or slowly dissolving as a function of time and not as a function of pH and being capable of dissolving in artificial intestinal fluid to the extent of between 2 and 12% within one hour and between 18 and 88% within three hours, said resin coating or embedding said erythromycin stearate particles in sufficient amounts so as to provide essentially intact passage of said particles with practically no significant amount of erythromycin stearate found absorbed in and taken up in the bloodstream, and without undue loss of active in large intestine for topical treatment of amebiasis.

2. The pharmaceutical dosage form of claim 1 in the form of a suspension.

References Cited

UNITED STATES PATENTS

| | | | |
|---|---|---|---|
| 3,431,338 | 3/1969 | Munzel | 424—21 |
| 3,143,472 | 8/1964 | Lappas et al. | 424—32 |
| 2,862,921 | 12/1958 | Booth et al. | 260—210 |
| 3,325,365 | 6/1967 | Hotko et al. | 424—32 |
| 2,897,122 | 7/1959 | Millar | 424—32 |
| 2,993,837 | 7/1961 | Millar et al. | 424—32 |

OTHER REFERENCES

Waks, J. Prensa, Med. Argent 51, 648–650, Sept. 11, 1964, Accion in vitro del estearia de eritomicina sobre cultivos monobach de la end amoela histolytica.

Waks, J. Prensa Med. Argent 52, 2242–4, Oct. 1, 1965 (Same title).

Waks, J. Prensa Med. Argent 52, 781–2, Apr. 23, 1965, actividad amebicida del estearato de eritromicina: aspectos clinicoterapeuticos.

Levy, A. et al.: Revista Brasileira de Medicina 6, 413–415 June 1967, A Clinical Study With Erythromycin Stearate (A–16535) in the Treatment of Intestinal Amebiasis (in Portuguese).

SHEP K. ROSE, Primary Examiner

U.S. Cl. X.R.

424—33, 34, 35